(12) United States Patent
Jan et al.

(10) Patent No.: US 9,476,305 B2
(45) Date of Patent: Oct. 25, 2016

(54) IMPINGEMENT-COOLED TURBINE ROTOR

(71) Applicant: HONEYWELL INTERNATIONAL INC., Morristown, NJ (US)

(72) Inventors: David K. Jan, Fountain Hills, AZ (US); Amandine Miner, Tempe, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 990 days.

(21) Appl. No.: 13/892,828

(22) Filed: May 13, 2013

(65) Prior Publication Data

US 2014/0348664 A1 Nov. 27, 2014

(51) Int. Cl.
| | |
|---|---|
| *F01D 5/08* | (2006.01) |
| *F01D 5/30* | (2006.01) |
| *F01D 5/04* | (2006.01) |
| *F01D 5/18* | (2006.01) |

(52) U.S. Cl.
CPC ............... *F01D 5/081* (2013.01); *F01D 5/046* (2013.01); *F01D 5/087* (2013.01); *F01D 5/3061* (2013.01); *F01D 5/045* (2013.01); *F01D 5/187* (2013.01); *F05D 2240/81* (2013.01); *F05D 2260/201* (2013.01); *Y02T 50/671* (2013.01); *Y02T 50/673* (2013.01); *Y02T 50/676* (2013.01)

(58) Field of Classification Search
CPC ...... F01D 5/081; F01D 5/087; F01D 5/3061; F01D 5/046; F01D 2240/81; F01D 5/187; F01D 5/045; F01D 2260/201; F01D 5/043
See application file for complete search history.

(56) References Cited

U.S. PATENT DOCUMENTS

| | | | |
|---|---|---|---|
| 2,439,127 A | | 4/1948 | Dailey, Jr. et al. |
| 2,660,399 A | * | 11/1953 | Robinson ............... F01D 5/066 |
| | | | 416/198 R |

(Continued)

FOREIGN PATENT DOCUMENTS

| | | |
|---|---|---|
| DE | 3802763 A1 | 8/1989 |
| EP | 1840385 A2 | 10/2007 |

(Continued)

OTHER PUBLICATIONS

USPTO Office Action, Notification Date Nov. 19, 2014; U.S. Appl. No. 13/444,070.

(Continued)

*Primary Examiner* — Richard Edgar
*Assistant Examiner* — Eldon Brockman
(74) *Attorney, Agent, or Firm* — Ingrassia Fisher & Lorenz, P.C.

(57) ABSTRACT

An integral turbine includes a forward hub section and an aft hub section. The forward hub section and the aft hub section are metallurgically coupled to one another along an annular interface that resides within a plane generally orthogonal to a rotational axis of the axially-split turbine. The turbine further includes an airfoil blade ring metallurgically coupled to a radial outer surface of the coupled forward and aft hub sections and an impingement cavity formed within an interior portion of the coupled forward and aft hub sections. The impingement cavity includes an interior surface that is positioned proximate to the radial outer surface of the coupled forward and aft hub sections. Further, an impingement cooling air flow impinges against the interior surface of the impingement cavity to provide convective and conductive cooling to the radial outer surface of the coupled forward and aft hub sections.

20 Claims, 5 Drawing Sheets

(56) References Cited

U.S. PATENT DOCUMENTS

| | | | |
|---|---|---|---|
| 2,859,933 A | 11/1958 | Whitaker | |
| 2,941,780 A * | 6/1960 | Von Der Nuell | F01D 5/045 415/143 |
| 3,065,954 A * | 11/1962 | Whitaker | F01D 5/045 415/218.1 |
| 3,167,301 A * | 1/1965 | Whitaker | F01D 5/045 415/119 |
| 3,297,301 A | 1/1967 | Petrie et al. | |
| 3,582,232 A * | 6/1971 | Okapuu | F01D 5/046 416/188 |
| 3,628,880 A | 12/1971 | Smuland et al. | |
| 3,642,383 A | 2/1972 | Andvig | |
| 3,818,696 A | 6/1974 | Beaufrere | |
| 4,175,911 A * | 11/1979 | Tiefenbacher | F01D 5/045 416/183 |
| 4,183,719 A * | 1/1980 | Bozung | F01D 5/045 415/143 |
| 4,263,992 A | 4/1981 | Moore et al. | |
| 4,335,997 A | 6/1982 | Ewing et al. | |
| 4,416,581 A * | 11/1983 | Geary, Jr. | F01D 5/087 415/1 |
| 4,417,381 A | 11/1983 | Higginbotham | |
| 4,428,717 A | 1/1984 | Catterfield | |
| 4,447,188 A * | 5/1984 | Davis | F01D 5/028 415/115 |
| 4,529,452 A | 7/1985 | Walker | |
| 4,538,331 A | 9/1985 | Egan et al. | |
| 4,554,789 A | 11/1985 | Napoli et al. | |
| 4,573,315 A | 3/1986 | Stroem | |
| 4,587,700 A | 5/1986 | Curbishley et al. | |
| 4,641,495 A | 2/1987 | Mowill | |
| 4,659,288 A | 4/1987 | Clark et al. | |
| 4,729,715 A | 3/1988 | Wilde | |
| 4,759,688 A | 7/1988 | Wright et al. | |
| 4,787,821 A * | 11/1988 | Cruse | B23K 20/021 228/118 |
| 4,822,244 A | 4/1989 | Maier et al. | |
| 4,826,397 A | 5/1989 | Shook et al. | |
| 4,923,370 A * | 5/1990 | Larson | F01D 5/043 415/115 |
| 5,061,154 A | 10/1991 | Kington | |
| 5,280,703 A | 1/1994 | Corrado et al. | |
| 5,497,615 A | 3/1996 | Noe et al. | |
| 5,572,862 A | 11/1996 | Mowill | |
| 5,735,046 A | 4/1998 | Frasier et al. | |
| 5,832,718 A | 11/1998 | Suttrop | |
| 5,961,287 A * | 10/1999 | Cairo | F01D 5/02 416/208 |
| 6,089,821 A | 7/2000 | Maguire et al. | |
| 6,146,091 A | 11/2000 | Watanabe et al. | |
| 6,196,792 B1 | 3/2001 | Lee et al. | |
| 6,325,871 B1 | 12/2001 | Burke et al. | |
| 6,331,217 B1 | 12/2001 | Burke et al. | |
| 6,351,938 B1 | 3/2002 | Kerrebrock | |
| 6,430,917 B1 | 8/2002 | Platts | |
| 6,805,535 B2 | 10/2004 | Tiemann | |
| 6,814,544 B2 | 11/2004 | Tsukamoto et al. | |
| 7,044,718 B1 | 5/2006 | Platts | |
| 7,378,132 B2 | 5/2008 | Renteria et al. | |
| 7,441,331 B2 | 10/2008 | Hudson et al. | |
| 7,458,766 B2 | 12/2008 | Dailey et al. | |
| 7,584,538 B2 | 9/2009 | Lee | |
| 7,654,094 B2 | 2/2010 | Yagi et al. | |
| 7,841,083 B2 | 11/2010 | Alaux et al. | |
| 8,015,705 B2 | 9/2011 | Wilson, Jr. et al. | |
| 8,061,989 B1 | 11/2011 | Liang | |
| 8,087,249 B2 | 1/2012 | Ottaviano et al. | |
| 8,147,208 B2 | 4/2012 | Hagshenas et al. | |
| 8,408,446 B1 | 4/2013 | Smoke et al. | |
| 8,920,128 B2 * | 12/2014 | Matwey | F01D 5/046 416/181 |
| 2006/0034695 A1 | 2/2006 | Hall et al. | |
| 2009/0056125 A1 | 3/2009 | Howe et al. | |
| 2009/0162205 A1 | 6/2009 | Strangman et al. | |
| 2010/0124483 A1 | 5/2010 | Weaver et al. | |
| 2010/0158668 A1 | 6/2010 | Ottaviano et al. | |
| 2011/0318183 A1 | 12/2011 | Noronha et al. | |
| 2013/0004316 A1 | 1/2013 | Matwey et al. | |
| 2013/0098061 A1* | 4/2013 | Matwey | F01D 5/046 60/785 |
| 2013/0272882 A1 | 10/2013 | Mittendorf et al. | |
| 2013/0280036 A1 | 10/2013 | Jan et al. | |

FOREIGN PATENT DOCUMENTS

| | | |
|---|---|---|
| EP | 2653652 A2 | 10/2013 |
| GB | 741054 A | 11/1955 |
| GB | 2028180 A | 3/1980 |
| GB | 2354043 A | 3/2001 |
| JP | 2004232622 A | 8/2004 |
| WO | 03043779 A1 | 5/2003 |

OTHER PUBLICATIONS

USPTO Office Action, Notification Date Nov. 21, 2014; U.S. Appl. No. 13/451,245.

Hammer A.N., Algret G. G., Psichogios T. P., Rodgers C.; Fabrication of Cooled Radial Turbine Rotor—Final Report (Solar Turbines International), NASA-CR-179503; Jun. 1986.

EP examination report for Application No. 14166274.2-1610 dated Mar. 12, 2015.

Snyder, P.H.; Cooled High-Temperature Radial Turbine Program, NASA National Aeronautics and Space Administration, NASA CR 189122 USAAVSCOM TR-92-C-010 Report No. EDR 15982; AD-A254827, May 1992.

Hammer, A.N. et al.; Fabrication of Cooled Radial Turbine Rotor; Final Report NASA CR-19503; Solar Turbines Incorporation, Jun. 1986.

EP Search Report for Application No. 14166274.2-1610/2803820 dated Dec. 18, 2014.

EP Exam Report for Application No. 14166274.2-1610 dated Jan. 22, 2015.

Notice of Allowance and Fee(s) Due for U.S. Appl. No. 13/444,070 dated Jan. 20, 2015.

EP Search Report for Application No. EP 13153710.2-1709/ 2626169 dated Feb. 10, 2016.

* cited by examiner

IMPINGEMENT-COOLED TURBINE ROTOR

TECHNICAL FIELD

The present invention relates generally to gas turbine engines and, more particularly, to gas turbine engines that incorporate impingement cooling internal to turbine rotors.

BACKGROUND

Gas turbine engines ("GTE") have been engineered extensively to improve efficiency, thrust-to-weight ratios, and other measures of engine performance. One of the most direct manners by which engine performance can be improved is through increases in the core rotational speeds and turbine inlet temperatures generated during engine operation. However, as turbine inlet temperatures and rotational speeds increase, so too do the thermal and mechanical demands placed on the GTE components. The most demanding performance requirements are typically placed on the high-pressure turbine rotor or rotors, which are positioned immediately downstream of the GTE combustion section and which rotate at the greatest speed during engine operation. The turbine blades, as well as surface regions of the turbine disk, in particular, are directly exposed to combustive gas flow at or near peak temperatures and are consequently heated to exceedingly high temperatures at which most alloys weaken or melt and become prone to oxidation or other forms of chemical and structural degradation.

Turbines can be broadly divided into two categories, axial and radial turbines, based upon the direction of airflow received by the turbine relative to the turbine's rotational axis. Each type of turbine has benefits and tradeoffs. For example, relative to axial turbines, radial turbines offer certain performance benefits including reduced aerodynamic loading which enable the turbine to operate at greater efficiencies, and higher tip speeds which reduce relative total temperatures that allow the turbine to operate at higher temperatures. However, due to the nature of their design, radial turbines are relatively lengthy in the axial direction. As a result, some radial turbines can be undesirably heavy and difficult to cool at the disk rim, especially at the mid section. Axial turbines are lighter weight due to shorter axial length but has relatively higher aerodynamic loading. So despite having shorter conduction distance from the sides of the disk hub to the rim, the higher gas path velocities can overwhelm the conduction cooling capability of some axial turbines. Regardless of the configuration, however, present turbine cooling schemes are unable to adequately cool the surface of the disk (between the blades, commonly referred to in the art as the "throat" region) of the turbine, resulting in undesirable high component metal operating temperatures and temperature gradients, especially during start-up and transient operational conditions. For at least these reasons, and despite the proposal of multiple axial and radial turbine designs in the prior art, few currently-implemented gas turbine engine platforms are able to operate at optimally-high temperatures without risking melting, oxidation, and/or other forms of degradation.

It would thus be desirable to provide a turbine suitable for usage in a gas turbine engine that can operate at elevated turbine inlet temperature levels. It would further be desirable to provide a turbine that has improved inter-blade disk surface region cooling characteristics. Furthermore, other desirable features and characteristics of the invention will become apparent from the subsequent detailed description and the appended claims, taken in conjunction with the accompanying drawings and this background of the invention.

BRIEF SUMMARY

Embodiments of an integral turbine rotor are provided. In one exemplary, non-limiting embodiment, an integral turbine rotor includes a forward hub section and an aft hub section. The forward hub section and the aft hub section are metallurgically coupled to one another along an annular interface that resides within a plane generally orthogonal to a rotational axis of the integral turbine rotor. The turbine further includes an airfoil blade ring metallurgically coupled to a radial outer surface of the bonded forward and aft hub sections and an impingement cavity formed within an interior portion of the bonded forward and aft hub sections. The impingement cavity includes an interior surface that is positioned proximate to the radial outer surface of the coupled forward and aft hub sections. Further, an impingement cooling air flow impinges against the interior surface of the impingement cavity to provide convective and conductive cooling to the radial outer surface of the bonded forward and aft hub sections.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

At least one example of the present invention will hereinafter be described in conjunction with the following figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments and implementations of the aluminum alloys and methods for the manufacture thereof described herein are exemplary embodiments provided to enable persons skilled in the art to make or use the invention and not to limit the scope of the invention, which is defined by the claims.

Furthermore, there is no intention to be bound by any expressed or implied theory presented in the preceding technical field, background, brief summary, or the following detailed description.

Figure 1:
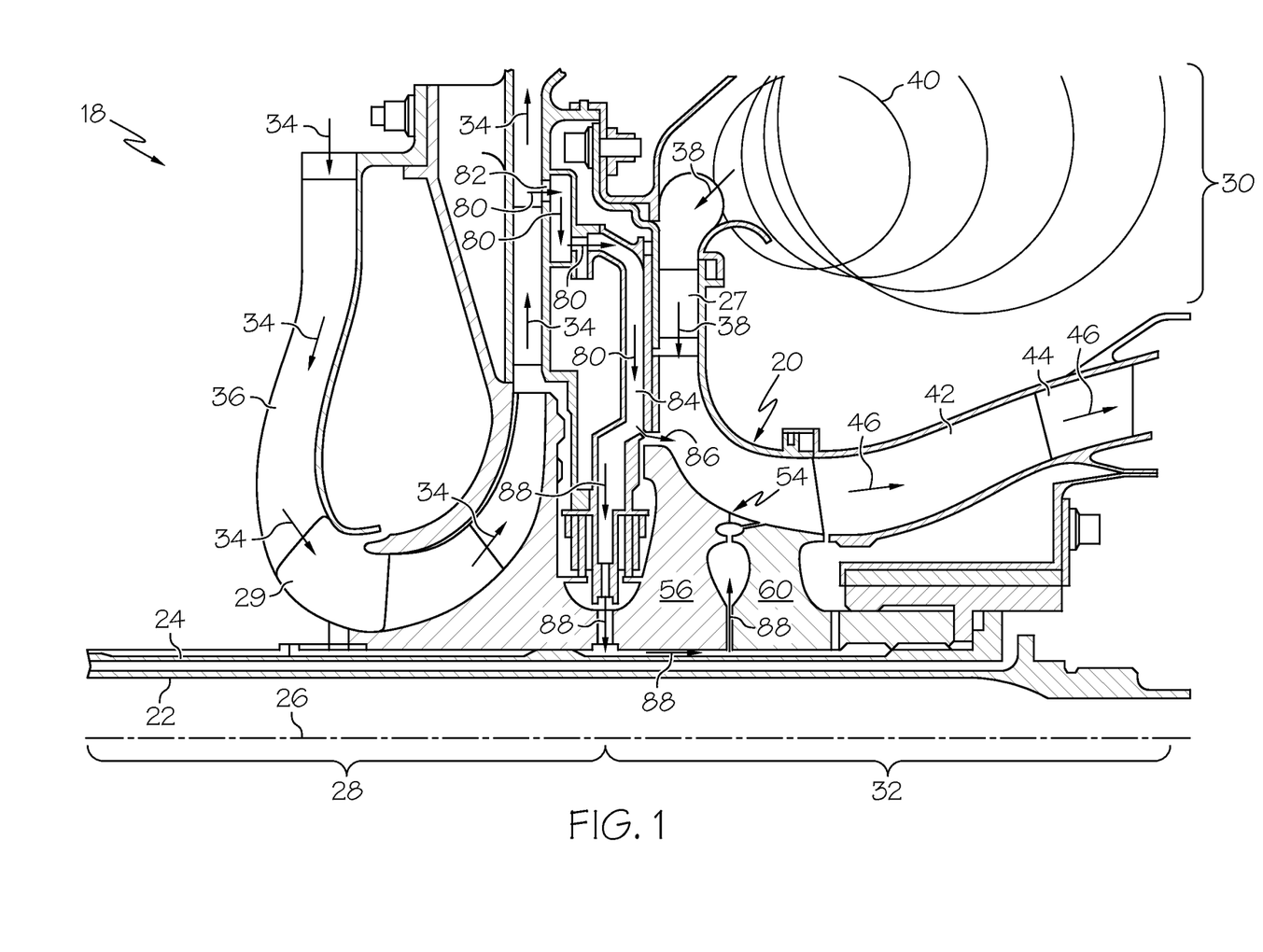
FIG. 1 is a simplified cross-sectional schematic illustration of an exemplary gas turbine engine (partially shown) including a radial-flow turbine rotor, as illustrated in accordance with an exemplary embodiment of the present invention.
Figure 3:
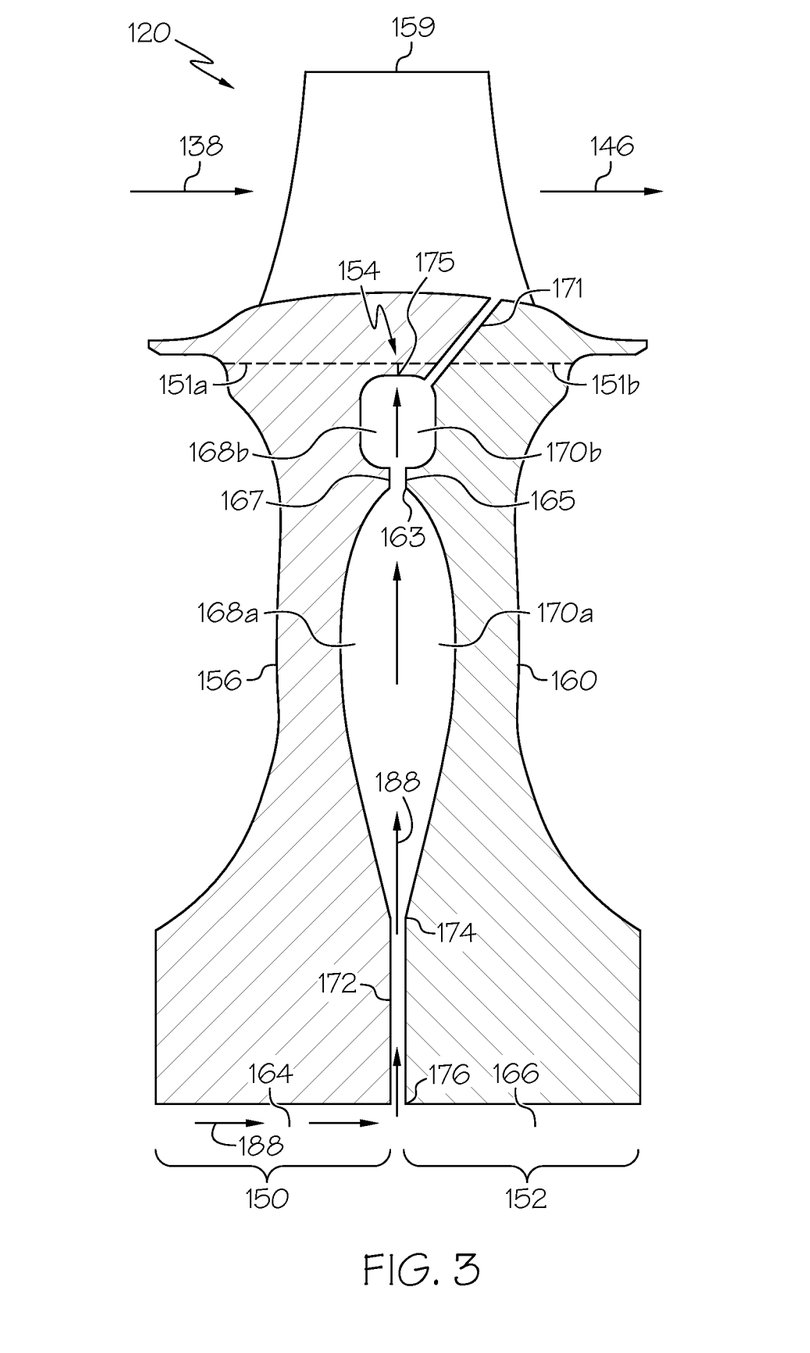
FIG. 3 is a simplified cross-sectional schematic illustration of a portion of an axial-flow turbine rotor in accordance with another exemplary embodiment of the present invention.

FIG. 1 is a simplified cross-sectional view of a portion of a gas turbine engine (GTE) 18 including a radial turbine rotor 20 with an internally-cooled, axially-split disk hub, as illustrated in accordance with an exemplary embodiment of the present invention. As illustrated in FIG. 1 and described herein, GTE 18 is offered by way of example only to provide a convenient and non-limiting context in which an exemplary embodiment of turbine rotor 20 can be described. It will be readily appreciated that embodiments of turbine rotor 20 can be employed within various types of gas turbine engines including, but not limited to, other types of turbofan, turboprop, turboshaft, and turbojet engines, whether deployed onboard an aircraft, watercraft, or ground vehicle (e.g., a tank), included within an auxiliary power unit, included within industrial power generators, or utilized within another platform or application. Furthermore, it will be readily appreciated that although FIG. 1 is presented in the context of a radial-flow turbine rotor configuration, other embodiments may be implanted in various axial-flow turbine rotor configurations. For simplicity, such axial-flow turbine rotor engine designs are not presented herein in detail, but the reader is directed to commonly-assigned U.S. Patent Application Publication 2013/0034433, and in particular FIG. 1 thereof, for an exemplary, non-limiting axial-flow turbine rotor design. Further, it is noted that the embodiment depicted in the present disclosure in FIG. 3 is an axial-flow turbine rotor configuration, suitable for use in the gas turbine engine shown in the above-noted Application Publication.

In the exemplary embodiment shown in FIG. 1, GTE 18 is illustrated as a two spool engine including a low pressure (LP) shaft 22 and a high pressure (HP) shaft 24. LP shaft 22 and HP shaft 24 are co-axial; that is, LP shaft 22 extends through a longitudinal channel provided through HP shaft 24 along a rotational axis 26. GTE 18 further includes a compressor section 28, a combustion section 30, and a turbine section 32, each of which is only partially shown in FIG. 1. An HP compressor 29 is included within compressor section 28 and mounted to the upstream or forward end of HP shaft 24. Radial turbine rotor 20, which is contained within turbine section 32, is mounted to the opposing, aft end of HP shaft 24 as the HP turbine. Although not shown in FIG. 1 for clarity, compressor section 28 and turbine section 32 may further include an LP compressor and an LP turbine, respectively, which may be mounted to opposing ends of LP shaft 22.

During engine operation, airflow is received from a non-illustrated intake section included within GTE 18 and supplied to compressor section 28. As indicated in FIG. 1 by arrows 34, a compressor section duct 36 guides the pressurized airflow through HP compressor 29, which further compresses the airflow prior to discharge into combustion section 30. The compressed airflow is directed into a combustion chamber (not shown) included within combustion section 30, mixed with fuel, and ignited to produce combustive gasses. As indicated in FIG. 1 by arrows 38, the combustive gasses expand rapidly, exit combustion section 30 through a turbine scroll 40, and are directed through a duct 27 to radial turbine rotor 20. The combustive gas flow drives rotation of radial turbine rotor 20, which drives further rotation of HP shaft 24 and HP compressor 29. After flowing through radial turbine rotor 20, a turbine section duct 42 directs the combustive gas flow into a turbine nozzle ring 44 (indicated in FIG. 1 by arrows 46). Turbine nozzle ring 44 accelerates the combustive gas flow and imparts the gas flow with a desired tangential component prior to reaching an LP turbine (not shown), which is positioned downstream of nozzle ring 44 and mounted to the aft end of LP shaft 22. The combustive gas flow drives the rotation of the non-illustrated LP turbine, which drives further rotation of the LP turbine and LP shaft 22. Collectively, the rotation of shafts 22 and 24 provides power output, which may be utilized in a variety of different manners, depending upon whether GTE 18 assumes the form of a turbofan, turboprop, turboshaft, turbojet engine, or an auxiliary power unit, to list but a few examples. The combustive gas flow is then mixed with cooler bypass flow and exhausted from GTE 18. For example, in the case of turbofan and turbojet engine, the combustive gas flow may be exhausted through a propulsion nozzle to provide forward thrust.

As indicated above, radial turbine rotor 20 is an integral turbine rotor and internally cooled; that is, the hub is fabricated from at least two discrete portions, which are separated along a plane orthogonal to rotational axis 26 and which are assembled to produce an integral turbine hub. In the exemplary embodiment illustrated in FIG. 1, specifically, radial turbine rotor 20 includes three portions, a forward turbine hub 56, and an aft turbine hub 60 and a bladed ring 59. The aft face of forward turbine hub 56 and the forward face of aft turbine hub 60 abut along a generally annular interface, which resides within the plane generally orthogonal to rotational axis 26 and which is referred to herein as "bond line 54." Forward turbine hub 56 and aft turbine hub 60 can be metallurgically bonded utilizing, for example, soldering, brazing, welding, or diffusion bonding.

Figure 2A:
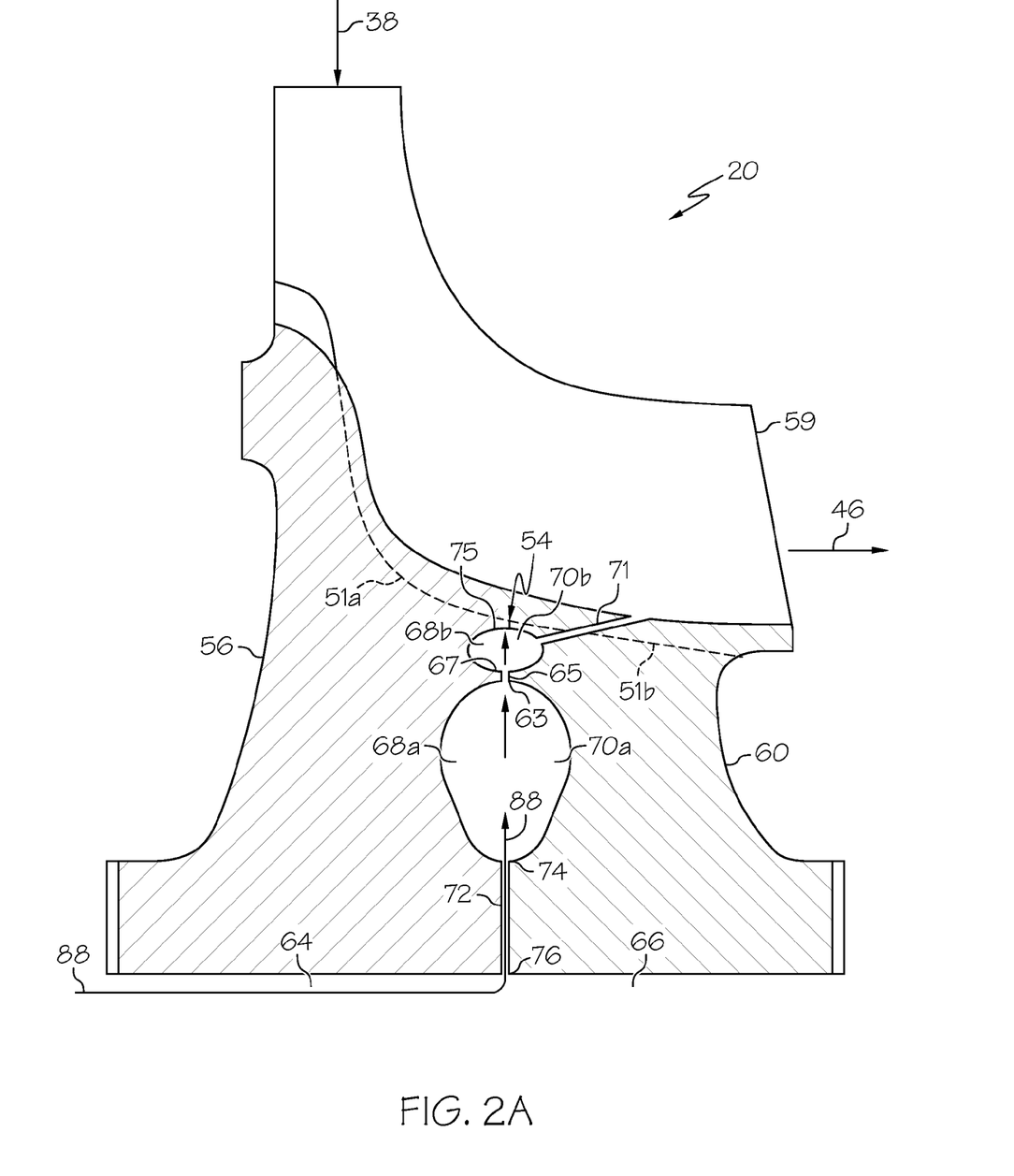
FIGS. 2A and 2B are cross-sectional views of a portion of a radial turbine rotor, in alternative embodiments.

In an alternative embodiment, radial turbine rotor 20 can be split into at least two separate turbine rotors, a forward turbine rotor 50 and aft turbine rotor 52 as shown in FIG. 2A, and may be assembled as discrete, non-bonded pieces, which are maintained in engagement utilizing mechanical means or metallurgical bonding. As used herein, the term "mechanical means" generally refers to an engagement of a first and a second component by a third component through the application of force. For example, forward turbine rotor 50 and aft turbine rotor 52 may be clamped together utilizing, for example, a tie shaft and curvic system (not shown). Alternatively, a plurality of bolts or other such fasteners (not shown) may be employed for such engagement.

The split-hub design of radial turbine rotor 20 offers several advantages not provided by conventional one piece or monolithic turbines, whether axial or radial, and specifically overcomes several disadvantages associated with monolithic radial turbines. First, by assembling radial turbine rotor 20 from multiple pieces, fabrication (e.g., casting and machining) of the turbine pieces can be enhanced. In particular, by reducing casting volume, components can be cast having more complex internal geometries thereby facilitating fabrication of components having internal cooling passages, for example to provide the impingement cooling described herein in greater detail below. Second, the multi-piece construction of radial turbine rotor 20 facilitates the formation of internal voids within the central disk of turbine rotor 20, whether created as cast-in features or through strategic removal of material. As a result, the overall mass of radial turbine rotor 20 can be favorably reduced. Third, in the case of the split hub design of radial turbine rotor 20, forward turbine hub 56 and aft turbine hub 60 can be fabricated from disparate materials tailored to the disparate operating conditions experienced by the aft and forward sections of rotor hub 56/60 during operation, as still further described below.

Fourth, in the case of the axially-split design of radial turbine rotor 20 (FIG. 2B), forward turbine rotor 50 and aft turbine rotor 52 can be fabricated from disparate materials tailored to the disparate operating conditions experienced by the aft and forward sections of rotor 20 during operation, as still further described below. Fifth, in the case of the axially-split design of the radial turbine rotor, the two halves of the blades can be thermally and structurally independent which results in reduction in blade thermal stresses. Additionally, the disk of radial turbine rotor 20 can be fabricated to include an internal cooling circuit, which may supply relatively cool airflow to the internal cooling passages formed within the turbine blades, as described more fully below in connection with FIG. 4.

Figure 2B:
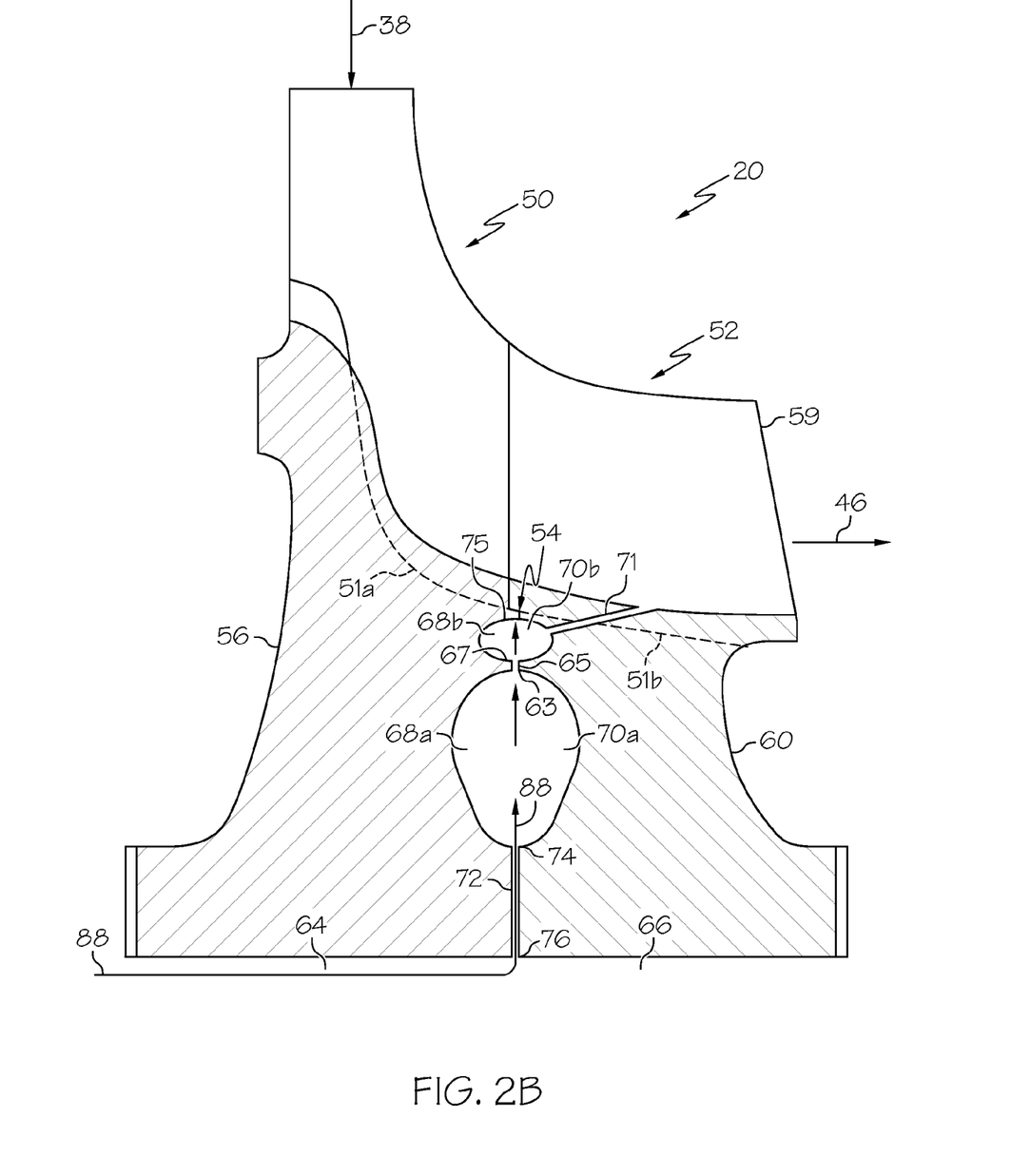

FIGS. 2A and 2B are cross-sectional views of a portion of radial turbine rotor 20, enlarged from the illustration thereof in FIG. 1, with FIG. 2A representing an integral turbine rotor and FIG. 2B representing an axially-split turbine rotor. As can be seen in FIGS. 2A and 2B, the turbine hub 56/60 includes a forward hub section 56, an aft hub section 60, and a plurality of integral blades 59, which are circumferentially spaced around and extend radially outward from hub sections 56/60. Bond lines 51*a*/51*b* illustrate the bonding region between forward hub section 56, aft hub section 60, and the integral blade 59, as will be described in greater detail below. It will be appreciated by those skilled in the art that FIGS. 2A and 2B are not a truly planar cross-section of the turbine, but rather follows the curvature of the integral blade 59.

Forward hub section 56 and aft hub section 60 assume the form of generally annular bodies having central openings 64 and 66 therein, respectively, as identified in FIGS. 2A and 2B. In the illustrated example shown in FIGS. 1, 2A and 2B, the inner diameter of central opening 64 provided through forward hub section 56 is generally equivalent to the inner diameter of central opening 66 provided through aft hub section 60. When radial turbine rotor 20 is assembled, forward hub section 56 aligns axially with aft hub section 60 and, preferably, radially pilots thereto. Although not shown in FIGS. 1, 2A, and 2B for clarity, a radially-overlapping hub interface (e.g., an annular lap joint) may be provided between forward hub section 56 and aft hub section 60 to radially pilot hub section 56 to forward hub section 60. In this manner, hub sections 56 and 60 combine to form a central hub 56, 60 when radial turbine rotor 20 is assembled. Central openings 64 and 66 likewise align when radial turbine rotor 20 is assembled to define a central opening 64, 66 through radial turbine rotor 20. When radial turbine 20 rotor is installed within GTE 18 (FIG. 1), a spool (e.g., high pressure shaft 24 of GTE 18) extends through this longitudinal channel. Radial turbine rotor 20 is fixedly mounted to the gas turbine engine spool utilizing, for example, a curvic-type attachment.

By virtue of its multi-piece construction, the integral turbine rotor 20 can be readily fabricated to include two inner disk cavities 68*a*, 70*a* and 68*b*, 70*b* (shown in FIG. 2A) for mass reduction and for impingement cooling purposes, respectively. For example, as indicated in FIGS. 1, 2A, and 2B, material may be removed from the back or trailing face of forward hub section 56 to form a first annular cavity or groove 68*a* therein. Additional material may be removed to form a second, smaller annular cavity or groove 68*b* therein. Similarly, material may be removed from the front or leading face of aft hub section 60 to form a first annular cavity or groove 70*a* therein. Additional material may be removed to form a second, smaller annular cavity or groove 70*b* therein. When radial turbine rotor 20 is assembled, the trailing face of forward hub section 56 is positioned adjacent the leading face of aft hub section 60, and grooves 68*a* and 70*a*, and 68*b* and 70*b* cooperate to define a first annular cavity 68*a*, 70*a* and a second annular cavity 68*b*, 70*b* within radial turbine rotor 20. Inner annular cavities 68*a*, 70*a* and 68*b*, 70*b* are fully contained within radial turbine rotor 20. Consequently, the provision of the annular cavities has minimal impact on the overall structural integrity of radial turbine rotor 20. In further embodiments, grooves 68*a*, 70*a*, 68*b*, and 70*b* can be fabricated as integral cast-in features. Annular cavity 68*b*, 70*b* may have a generally circular, elliptical, or ovoid radial cross-section, as shown in FIGS. 2A and 2B. Notably, the creation of an internal cavity or cavities within radial turbine rotor 20 facilitates the formation the hub cooling passages for impingement cooling through central hub 56, 60 of radial turbine rotor 20, as described below.

As shown in FIGS. 2A and 2B, annular cavity 68*a*, 70*a* may be fluidly coupled to the inlet 63 of an impingement flow passage 65 formed within the hub 56, 60 and to the outlet of a cooling air flow passage 72 also formed within the hub 56, 60. During operation of GTE 18 (FIG. 1), airflow may be bled from a section of the engine upstream of combustion section 30; e.g., as indicated in FIG. 1 by arrows 80, a portion of the airflow flowing within compressor section duct 36 may be diverted into outlet 82 of a combustion bypass conduit 84. A portion of this cooler bypass airflow may be directed via an aperture in the conduit toward the leading edge of forward hub section 56 to provide saddle region cooling (indicated in FIG. 1 by arrow 86), while the remainder other bypass air (indicated by arrow 88) may be directed radially inward toward the engine centerline, flow axially along HP shaft 24, and may ultimately flow into inlet 76 of the hub cooling air passages 72 to provide cooling of hub 56, 60. (In an alternative embodiment, a TOBI system that processes compressor discharge air may be employed to provide cooling air). In some embodiments, the cooling air flow 88 may be turbulated prior to entering HP shaft 24. Turbulating features may be machined or cut into the turbine rotor prior to the region where the cooling air flows into HP shaft 24 (not shown). Additionally, in the case of the axially split rotor, annular cavity 68*b*, 70*b* may be fluidly coupled to the inlet or inlets of one or more cooling flow passages formed within blade segments 59.

In the prior art, disk rims, particularly the mid-rim region, are indirectly cooled by conduction to the cooler disk below. This indirect cooling is accomplished by cooling the forward and aft surfaces of the disk below the gas path with purge flow introduced into the disk cavities to prevent gas ingestion. This indirect cooling is limited in its effectiveness to control disk rim temperatures. The rim is heavily scrubbed by high velocity gas path flow and without a similarly powerful cooling mechanism, the rim temperature is sensitive to engine-to-engine radial profile variations and a host of secondary flow control variables such as the flow discouragers' axial and radial position throughout the operating envelope that affects the rim region's thermal boundary conditions. The radial turbine's longer mid-rim region is particularly difficult to cool by conduction due to its greater surface exposure to the gas path combined with its significantly greater distance from the forward and aft disk faces.

In embodiments of the present disclosure as illustrated in FIGS. 2A and 2B, such mid-rim cooling difficulties that are encountered in the prior art are addressed in the following manner: air flows through cooling air passage 72 after which it enters into annular cavity 68a, 70a. The outlet 63 of annular cavity 68a, 70a leads into impingement flow passage 65. Due to the air pressure that accumulates within annular cavity 68a, 70a during operation of GTE 18, cooling air is accelerated very quickly through impingement flow passage 65. Upon reaching the outlet of impingement flow passage 65, the cooling air has formed a narrow, high-speed impingement cooling stream that is directed at a radial surface 75 of annular cavity 68b, 70b. The impingement cooling stream thus impinges at high speed against the radial surface 75 to provide impingement cooling thereto. It is noted that the annular cavity 68b, 70b is located beneath the region of high gas path acceleration, just forward of the aforementioned "throat" region of the hot air flow 38 passage along the surface of radial turbine rotor 20 between blades 59, which experiences high heating due to the local acceleration of the air therealong. (In axial rotors with its shorter flow path, the cavity is directly beneath the throat region). Thus, by impingement cooling at surface 75, heat is conducted from the surface of radial turbine rotor 20 in the throat region to allow such region to operate at a desirably lower temperature. After impingement cooling, the cooling air exits annular cavity 68b, 70b via channel 71, which may be drilled into the turbine rotor 20 after the formation thereof. A secondary cooling benefit may thus be achieved by virtue of the cooling air exit flow as it reaches the hub outer surface at the throat region In some embodiments, forward hub section 56 and aft hub section 60 may be fabricated from disparate materials tailored to the disparate operating conditions experienced by the aft and fore sections of the rotor hubs 56/60. For example, as the temperatures to which forward hub section 56 is exposed will typically be significantly higher than the temperatures to which aft hub section 60 is exposed, forward hub section 56 may be fabricated from a metal or alloy, such as a nickel-based superalloy, having a relatively high density and thermal tolerance. In contrast, aft hub section 60 may be fabricated from a metal or alloy having a lower thermal tolerance (e.g., a titanium-based superalloy) and a lower density. In this manner, the temperature capabilities of turbine rotor 20 can be maximized to improve various measures of engine performance (e.g., specific fuel consumption and power density), while the overall weight of turbine rotor 20 is reduced as compared to a monolithic or single piece turbine rotor fabricated entirely from a heavier superalloy having higher thermal tolerances. Criteria other than relative densities and thermal tolerances may be utilized to select the material or materials from which aft hub section 56 and forward hub section 60 are fabricated. For example, as mechanical stress arising from centrifugal forces will typically concentrate in forward hub section 56, hub section 56 may be fabricated from a material having a relatively high mechanical strength to decrease the likelihood of crack formation and propagation, and improve creep resistance, during high speed operation of turbine rotor 20. Additionally, forward and aft hub sections 56 and 60 may be fabricated from the same or similar alloy, but subjected to different process steps (forged and/or heat treated differently) to tailor material properties (e.g., grain sizes) to the particular conditions to which the individual pieces are subjected.

In some embodiments, a ring of blade structures 59 may be formed by metallurgical bonding a series of bladed pieces together. As utilized herein, the term "bladed ring" denotes any structural element or assemblage of structural elements at least a portion of which has a generally arc-shaped or curved geometry and which are able to be arranged in a partial or complete ring formation with a number of like bladed pieces. In a preferred embodiment, each blade structure 59 is cast from a single crystal superalloy having its crystallographic grain structure oriented to provide optimal mechanical strength in a radial direction. By way of non-limiting example, an oxidation-resistant, single crystal, nickel-based superalloy may be utilized, such as the nickel-based superalloy commercially identified as "CMSX 4." This notwithstanding, the bladed ring 59 may be fabricated from other high temperature materials, as well, including equi-axed superalloys.

After fabrication of the bladed ring, the bladed ring may be bonded to a rotor disk (such as may form hub sections 56 or 60) to produce a turbine rotor, such as either an integral turbine rotor 20 as shown in FIGS. 1 and 2A, or split rotors 50 and 52 shown in FIG. 2B. Bond lines 51a and 51b illustrate such bonding location and orientation with regard to the integral hub 56/60. The interior of the monolithic bladed ring may be machined to generally conform with the separately-fabricated rotor disk, which is described below.

The turbine rotor is preferably fabricated from alloys tailored to the unique operational environment of the rotor components. In one implementation, rotor disk is fabricated from an oxidation-resistant, nickel-based superalloy having relatively high low cycle fatigue properties; while the bladed ring is fabricated from a turbine superalloy having relatively high stress rupture and oxidation-resistant properties. The disk forging is split into two halves and the impingement features are machined on each half prior to metallurgically coupling the two halves back together again along bond line 54. After production of the rotor disk forging, the outer annular portion of rotor disk may be machined to impart disk with a desired surface finish and an outer diameter approximately equivalent to the inner diameter of machined airfoil ring. Machined bladed ring is then fitted onto the machined rotor disk 56/60. The leading and trailing annular interfaces between the inner circumference of ring and the outer circumference of disk are sealed by, for example, brazing (or any process to create a vacuum seal between the two parts) to prevent the ingress of air into the ring-disk interface that may otherwise interfere with bonding. A HIP diffusion bonding process or other direct thermal bonding process is then carried-out to bond bladed ring to rotor disk and thereby yield a metallurgically-bonded turbine rotor 20. As noted above, a cooling air exit channel 71 may be drilled into the hub, subsequent to the HIP diffusion bonding, to provide an exit path for the cooling air from the impingement cavity.

In another implementation, the disk forging is split into two halves and the impingement features are machined on each half. After production of the rotor disk forgings, the outer annular portions of rotor disks may be machined to impart disks with a desired surface finish and an outer diameter approximately equivalent to the inner diameter of machined airfoil rings. The machined bladed rings are then fitted onto the machined rotor disks 56 or 60. The leading and trailing annular interfaces between the inner circumference of the rings and the outer circumference of the disks are sealed by, for example, brazing (or any process to create a vacuum seal between the two parts) to prevent the ingress of air into the ring-disk interface that may otherwise interfere with bonding. A HIP diffusion bonding process or other direct thermal bonding process is then carried-out to bond bladed rings to rotor disks and thereby yield two separate metallurgically-bonded turbine rotors, such as split turbine rotors 50 or 52 shown in FIG. 2A. The two turbines are then mechanically coupled together along bond line 54. As noted above, a cooling air exit channel may be drilled into the hub 71, subsequent to the HIP diffusion bonding, to provide an exit path for the cooling air from the impingement cavity.

FIG. 3 depicts an alternative embodiment of the present disclosure. In FIG. 3, for ease of reference, like numerals have been incremented by 100. FIG. 3 depicts an exemplary axial-flow integral turbine rotor 120. Axial flow turbine rotor generally includes blades 159, hub 156, 160, central opening 164, 166 annular cavity 168a, 170a, and impingement annular cavity 168b, 170b. The hub section 156/160 is axially split along split line 154. The blades 159 are bonded to the hub along bond lines 151a, 151b. In operation, air flow 138 impinges upon blades 159, which causes blades 159 and the hub 156, 160 to rotate around an axis. As described above with regard to FIGS. 2A and 2B, cooling air flow 188 enters the annular hub 168a, 170a via cooling air flow passage 172. Therein, the cooling air accumulates and builds pressure, and is forced at high speed though impingement passage 165. The resulting narrow, high-speed impingement cooling air flow impinges upon radial surface 175 of impingement cavity 168b, 170b for impingement cooling of the outer surface of the turbine 120 between the blades 159. The cooling air then exits the impingement cavity 168b, 170 via channel 171. The split hub impingement cooling concept can also be applied to cooled bladed rings.

Figure 4:
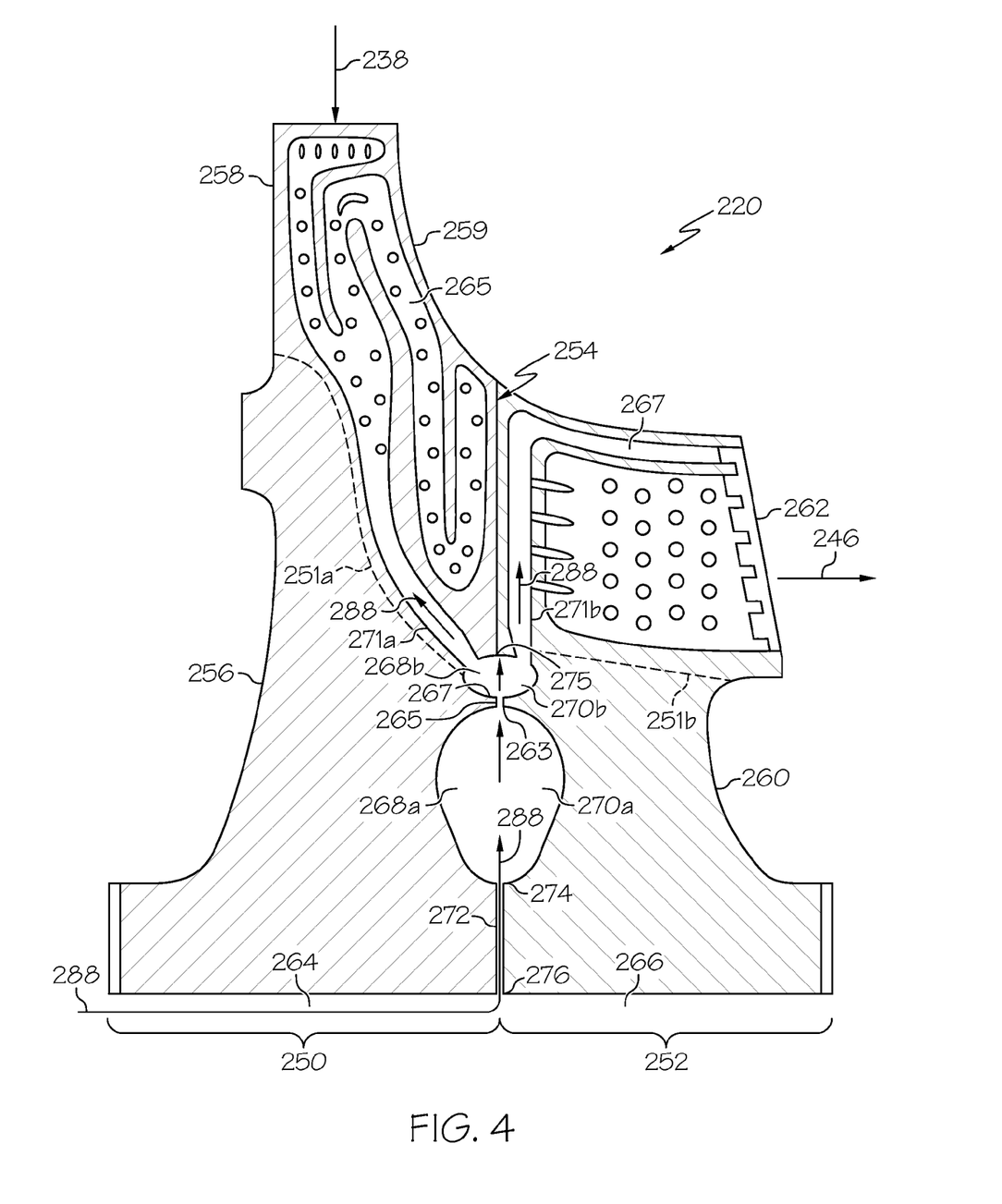
FIG. 4 is a simplified cross-sectional schematic illustration of a portion of a radial-flow turbine rotor that incorporates an internal blade cooling scheme in accordance with yet another exemplary embodiment of the present invention.

FIG. 4 depicts a further alternative embodiment of the present disclosure. In FIG. 4, for ease of reference, like numerals have been incremented by a further 100. FIG. 4 depicts an exemplary axially-split radial-flow turbine rotor 220. In contrast to radial turbine rotor 20 depicted in FIG. 2, the blade 259 is split into two blade segments 258, 262. Thus, like the hub 256, 260, the blade 259 (in particular segments 258, 262 thereof) may be made of different materials for thermal management purposes. In further contrast to radial turbine rotor 20 depicted in FIG. 2, the blade 259 is internally cooled via a plurality of internal cooling circuits, as will be described below.

With continue reference to FIG. 4, the turbine rotor 220 is axially split along split line 254. The blades 259 (in particular segments 258, 262 thereof) are bonded to the hub along bond lines 251a, 251b respectively. In operation, air flow 238 impinges upon blades 259, which causes blades 259 and the hub 256, 260 to rotate around an axis. As described above with regard to FIGS. 2A and 2B, cooling air flow 288 enters the annular hub 268a, 270a via cooling air flow passage 272. Therein, the cooling air accumulates and builds pressure, and is forced at high speed though impingement passage 265. The resulting narrow, high-speed impingement cooling air flow impinges upon radial surface 275 of impingement cavity 268b, 270b for impingement cooling of the outer surface of the turbine 220 between the blades 259.

With reference to FIG. 4, axially-split radial turbine rotor 220 is fabricated to include a plurality of internal blade cooling air passages 265, 267. Cooling passages 265, 267 each extend in a serpentine manner through a respective one of blade segment 258, 262. The cooling passages 265, 267 include a plurality of conductive/convective cooling features. Cooling air 288 is supplied into the internal blade cooling air passages 265, 267 from the annular impingement cavity 268b, 270b. That is, once the cooling air impinges against radial surface 275, the cooling air (rather than being directed out of the hub via a flow channel as in FIGS. 2A, 2B, and 3) is directed via channels 271a, 271b into internal blade cooling air passages 265, 267, respectively. Thus, the cooling air 288 in this embodiment serves the further purpose of internally cooling the blades 259. The cooling air finally exits the blade segments 258, 262 via a plurality of vent holes that are fabricated into the blade segments 258, 262.

The impingement cavity for radial turbine rotors exemplified by 68b and 70b shown in FIGS. 2a and 2b may be may be configured as one cavity with circumferentially uninterrupted surfaces or the cavity may be configured as multiple cavities. In moderately stressed radial turbine rotors, the cavity may be a single cavity, with the advantage of low cost in manufacturing. In highly stressed radial turbine rotors, the impingement cavity 68b and 70b may comprise multiple cavities. An example may be multiple cavities separated by ribs, each rib extending radially inward from the blade root. The ribs serve as structural ties that help stiffen the relatively thin rim section to limit radial deflection and reduce rim stress by spreading the pull-load to the supporting disk below. The ribs also increase the surface area that can be convectively cooled and help to cool the disk rim by conduction.

The impingement cavity for axial turbine rotors exemplified by 168b and 170b shown in FIG. 3 may similarly be configured as one cavity or multiple cavities. In low cost or limited-life application axial turbine rotors, the cavity may be a single cavity with circumferentially uninterrupted surfaces. In highly stressed or long-life applications, the axial turbine rotor disk rim is typically slotted between blades with each slot terminating in a stress-relief hole. In this configuration, multiple impingement cavities may be machined, one under each blade root.

Thus it will be appreciated that the foregoing embodiments described in this disclosure have provided improved gas turbine engines that exhibit improved mid-disk rim cooling through the use of impingement cooling within the disk. This improved cooling allows the turbines to be operated at an optimally higher temperature, while suffering less thermal degradation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as setforth in the appended claims.

What is claimed is:

1. An integral turbine rotor comprising:
a forward hub section;
an aft hub section, wherein the forward hub section and the aft hub section are coupled to one another along an annular interface that resides within a plane generally orthogonal to a rotational axis of the integral turbine rotor;
an airfoil blade ring, which comprises a plurality of integral blades, which are circumferentially spaced around and extend radially outward of the coupled forward and after hub sections, coupled to a radial outer surface of the coupled forward and aft hub sections;
an impingement cavity formed within an interior portion of the coupled forward and aft hub sections, wherein the impingement cavity comprises an interior surface that is positioned proximate to the radial outer surface of the coupled forward and aft hub sections;

an impingement air flow channel in fluid communication with the impingement cavity, wherein cooling air is accelerated and narrowed as it flows through the impingement air flow channel to produce the impingement cooling air flow;

an internal hub cavity formed within an interior portion of the coupled forward and aft hub section that is in fluid communication with the impingement air flow channel, wherein cooling air flows from the internal hub cavity into the impingement air flow channel, wherein the internal hub cavity is positioned radially-inward from the impingement cavity within the interior portion of the coupled forward and aft hub section, wherein the impingement air flow channel has an axial width that is less than a greatest axial width of both the impingement cavity and the internal hub cavity, and wherein the impingement air flow channel provides fluid connection between the internal hub cavity and the impingement cavity, wherein an impingement cooling air flow impinges against the interior surface of the impingement cavity to provide convective and conductive cooling to the radial outer surface of the coupled forward and aft hub sections; and a central opening located radially inward from the internal hub cavity, and a hub cooling air passage, wherein the hub cooling air passage has an axial width that is less than a greatest axial width of both the impingement cavity and the internal hub cavity, and wherein the hub cooling air passage provides fluid connection between the central opening and the internal hub cavity.

2. The integral turbine rotor similar to claim 1, further comprising a second airfoil blade spaced apart from the first airfoil blade and each metallurgically coupled to the radial outer surface of the coupled forward and aft hub section, wherein the interior surface of the impingement cavity is positioned proximate to a portion of the radial outer surface in between the first and second airfoil blades.

3. The integral turbine rotor of claim 1, wherein the interior surface of the impingement cavity is positioned proximate to an axially mid portion of the outer surface of the coupled forward and aft hub section.

4. The integral turbine rotor of claim 3, wherein the impingement cavity is positioned along the annular interface where the forward and the aft hub sections are coupled.

5. The integral turbine rotor of claim 1, further comprising an impingement air flow channel in fluid communication with the impingement cavity, wherein cooling air is accelerated and narrowed as it flows through the impingement air flow channel to produce the impingement cooling air flow.

6. The integral turbine rotor of claim 5, wherein the impingement air flow channel is positioned along the annular interface where the forward and the aft hub sections are coupled.

7. The integral turbine of claim 5, further comprising an internal hub cavity in fluid communication with the impingement air flow channel, wherein cooling air flows from the internal hub cavity into the impingement air flow channel.

8. The integral turbine of claim 7, wherein the internal hub cavity is positioned radially inward from the impingement cavity.

9. The integral turbine rotor of claim 1, wherein the turbine is a radial flow turbine.

10. The integral turbine of claim 1, wherein the turbine is an axial flow turbine.

11. The integral turbine rotor of claim 1, wherein the airfoil blade ring comprises a single, integrally-fabricated component.

12. The integral turbine rotor of claim 1, further comprising a cooling air flow exit channel in fluid communication with the impingement cavity and extending between the impingement cavity and the radial outer surface of the coupled forward and aft hub sections, wherein cooling air flow exits the turbine through the cooling air flow exit channel subsequent to impinging upon the interior surface of the impingement cavity.

13. The integral turbine of claim 1, wherein the first airfoil blade comprises an internal blade cooling circuit in fluid communication with the impingement cavity, wherein cooling air flow enters the internal blade cooling circuit subsequent to impinging upon the interior surface of the impingement cavity to provide a cooling flow within the first airfoil blade.

14. The integral turbine rotor of claim 1, where the forward hub section comprises a first metal alloy and the aft hub section comprises a second metal alloy that is either different from or identical to the first metal alloy.

15. The integral turbine of claim 1, wherein the impingement cavity comprises a generally circular, elliptical, or ovoid radial cross-section.

16. The integral turbine of claim 1, further comprising an axially-oriented central opening in fluid communication with the internal hub cavity for providing cooling air thereto.

17. The integral turbine of claim 1, wherein the axially-oriented central opening is in fluid communication with a compressor bypass duct for providing compressor bypass air as the cooling air.

18. The integral turbine rotor of claim 1, where the impingement cavity is one cavity.

19. The integral turbine rotor of claim 1, where the impingement cavity comprises multiple cavities.

20. The integral turbine rotor of claim 1, wherein the second airfoil blade comprises an internal blade cooling circuit in fluid communication with the impingement cavity, wherein cooling air flow enters the internal blade cooling circuit subsequent to impinging upon the interior surface of the impingement cavity to provide a cooling flow within the second airfoil blade.

* * * * *